J. E. Finley,
Bee Hive.
No. 91,321. Patented June 15, 1869.
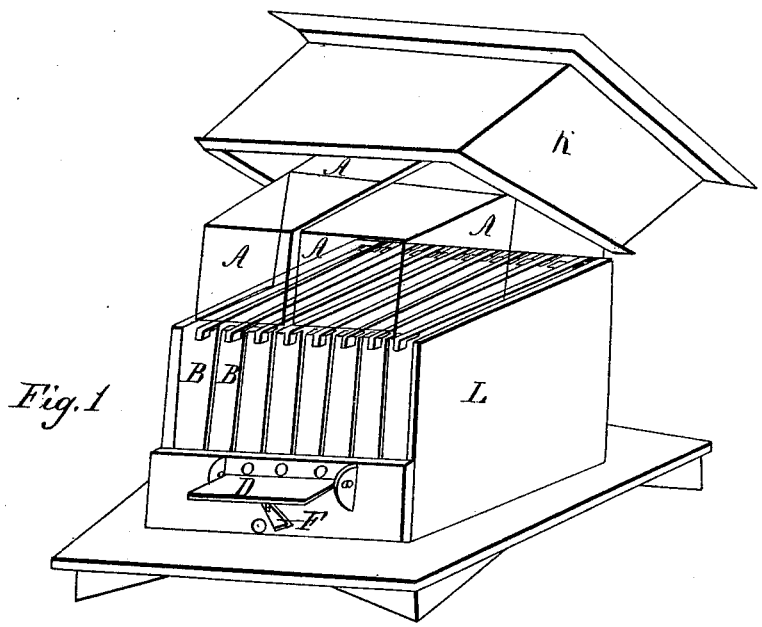
Fig. 1
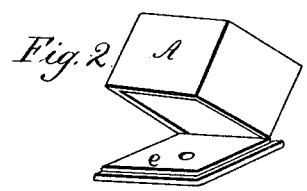
Fig. 2
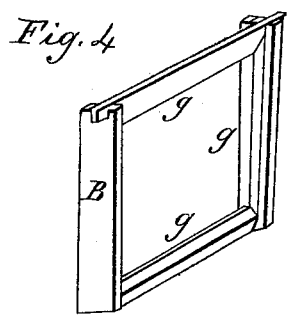
Fig. 4
Fig. 3
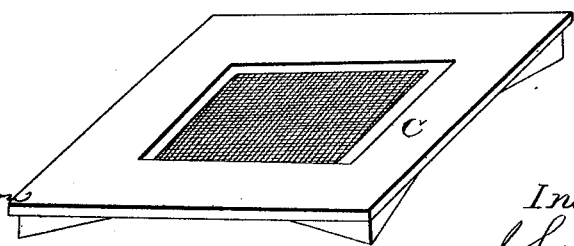
Witnesses
James A. Cameron
Perry Finley
Inventor
John E. Finley 2 Sheets
Sheet 2

J. E. Finley,
Bee Hive.

No. 91,321.   Patented June 15, 1869

United States Patent Office.

JOHN E. FINLEY, OF ENON, OHIO.

Letters Patent No. 91,321, dated June 15, 1869.

---

IMPROVEMENT IN BEE-HIVES.

---

The Schedule referred to in these Letters Patent and making part of the same.

---

Be it known that I, JOHN E. FINLEY, of Enon, county of Clark, and State of Ohio, have invented a new and useful Improvement in Italian Bee-Hives; and I do hereby declare that the following is a full, clear, and exact description of the construction and operation of the same, reference being had to the annexed drawings, making a part of this specification, in which—

Figure 1:
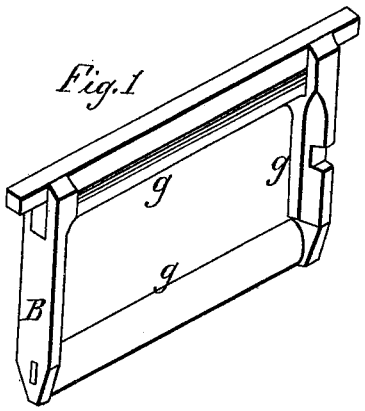
Figure 2:
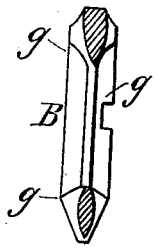

Figure 1 is a perspective view.
Figure 2, view of honey-box.
Figure 3, plan view of bottom, with ventilator.
Figure 4, view of movable comb-frame.
Figures 1 and 2, sheet 2, a perspective and a vertical section of the comb-frames.
4, main section of hive.
K, cap.
A A, honey-boxes.
B B, movable comb-frames.
D and E, adjustable entrances.
Q, bottom of honey-box.
C, ventilator.
$g\ g\ g$, knife-like edges of the movable comb-frame B.

I construct my hive in an oblong, or square form, divided in two sections, as seen in K and 4.

The main section, 4, is provided with movable comb-frames, B B, which are made in such a manner that the top or cross-bar projects over enough to enter square notches in the top of the hives' sides which hold the frames B B in a perpendicular position, and prevent the frames B B from being displaced.

The top, with the bottom of the movable comb-frames B B, are made with a knife-like edge, projecting inward, while the ends are provided with a like projection from the centre of the end-piece, which serves as a convenient projection for the bees to fasten their combs.

The end sections of these combs are made of such a width as to correspond with the width of an ordinary brood-comb, or about seven-eighths of an inch, while the construction of the movable comb-frames B B, with their knife-like edges $g\ g\ g$, will make it difficult for the bees to build any but regular combs.

To the main section of the hive 4, I have two entrances, made adjustable by means of a slide or shut-off, E, for the lower entrance, while the upper entrance is closed or opened by turning down or up the hinged lighting-board D.

The object of these entrances is to facilitate the working of the bees, and when desired, the entrance F can be closed, and the upper entrance left open, while D serves as a lighting-board; and moths, or other insects would have to enter the main body of bees before having a place to deposit their eggs.

To the main section 4, I have a bottom with projecting sides and ends, secured to the main section of the hive 4.

In the centre of the bottom I have a ventilator, C, made of wire gauze, or other suitable material, placed in a frame, and made movable, for the purpose of being moved, when desired, from the bottom of the hive, when hiving the bees, or for cleansing the hive, while it serves to ventilate the hive when the entrances are closed for transportation or other purposes.

Upon the top of the movable comb-frames B B, I place two or more honey-boxes, made of glass, wood, or other suitable material.

I construct my honey-boxes in the following manner: The box is blown of glass, made square or round, as desired. The bottom is then blown or pressed, with a groove around the edge, and a projection to fit the inside of the box or jar, while the surface of the bottom Q, is made flat, to rest upon the bars B B.

In the centre of the bottom Q, is an entrance-hole to admit the bees into the honey-boxes, as shown in fig. 2.

The object of the grooved bottom Q, with the projection on the inside, is to form a honey-box in such a manner as to facilitate the working of the bees, by having as little space as possible between the frames and honey-boxes, and when filled, to be readily prepared for sale or use.

When these boxes are made of wood, the lid is grooved and made with the same projection, and for the same object as stated when blown of glass.

The object of my invention is to provide bee-hives with movable comb-frames, made in such a manner as to facilitate the building of straight, regular, brood-combs, and making it difficult for the bees to build any but straight and regular combs.

Another object of my invention is, to provide bee-hives with a neat and convenient honey-box, as described.

I do not claim separately any of the devices herein shown, except the comb-frames, for I am aware they are not new in themselves; nor do I broadly claim removable comb-frames with sharpened edges, as the same have been used; but

What I claim as my invention, and wish to secure by Letters Patent, is—

The removable comb-frame B, constructed with the sharpened edges $g\ g\ g$, as shown and specified.

In combination with said frames when they are constructed as set forth, the hive herein described, with ventilator, entrances, and honey-boxes.

JOHN E. FINLEY.

Witnesses:
PERRY FINLEY,
JAMES A. CAMERON.